Dec. 28, 1965 V. R. DEITZ 3,226,228
METHOD AND APPARATUS FOR PRODUCING A CONTROLLED PATTERN OF
ULTRAVIOLET RADIATION FROM THAT AT HIGHER WAVE LENGTHS
Filed Jan. 11, 1963

INVENTOR
VICTOR R. DEITZ

BY Beale and Jones
ATTORNEYS ns Patented Dec. 28, 1965

3,226,228
METHOD AND APPARATUS FOR PRODUCING A CONTROLLED PATTERN OF ULTRAVIOLET RADIATION FROM THAT AT HIGHER WAVE LENGTHS
Victor R. Deitz, Washington, D.C., assignor to William Siskind, Takoma Park, Md.
Filed Jan. 11, 1963, Ser. No. 250,843
11 Claims. (Cl. 96—27)

This invention relates to a new and useful method and apparatus for controlling radiation. More particularly this invention relates to a new and useful method and apparatus for controlling the output radiation by directing the path of the incident light to a special device that uses it to produce a controlled pattern of ultra-violet radiation. This invention can be utilized to expose diazo-sensitized paper for reproduction of original prints wherein radiation in the range of visible light is converted into a controlled pattern of ultraviolet radiation. The use of ultra-violet radiation sensitive layers of diazo compounds in the field of print reproduction is well-known. After exposure diazo-sensitized paper can be developed by any of the commonly used dry gas, wet, or heat processes.

The processes using diazo-sensitized paper to produce copies are relatively inexpensive as compared to other reproduction processes, but the methods and apparatus for exposing diazo-sensitized paper require that the original print be on a transparent or translucent sheet, and that the original outline be able to block out ultra-violet radiation. The original copy must also be in contact with the diazo-sensitized paper. An exception to the above described method and apparatus is the reflex process in which the ultra-violet radiation is directly reflected from the original copy onto the sensitized sheet. Thus the reflex process requires (1) the original print to selectively absorb or reflect ultra-violet radiation and (2) the sensitized sheet be transparent.

The object of this invention is to provide a new and useful method and apparatus for producing controlled patterns of ultra-violet radiation prior to exposure of the diazo-sensitized paper.

More particularly the object of this invention is to provide a new method and apparatus for exposing sensitized paper which is simple in operation, and does not require the original print to be placed in direct contact with the sensitized paper.

A further object of this invention is to provide a new method and apparatus for exposing sensitized paper which does not require the original print to be on transparent paper and does not require that the original print pass, absorb, or reflect the ultra-violet radiation.

A further object of this invention is to provide a novel exposure device which allows enlargement or reduction in size of the original print.

According to this invention the initial radiation from the illuminated object is directed by reflection to a modifier device which modifies the wave length of the radiation and permits a successful exposure of the diazo-sensitized paper to the controlled pattern of ultra-violet radiation. In the case of a reproduction device the first object is an original print and the reflector can be a mirror. The reflected radiation is visible light, or near ultra-violet radiation which is modified and amplified as required to ultra-violet radiation prior to exposure of a diazo-sensitized sheet. The exposed sheet can then be developed by one of the well-known developing processes mentioned above.

Other features of the invention will be described and will be obvious from the following description and from the claims appended thereto. The description has reference to the accompanying drawings in which:

Figure 1:
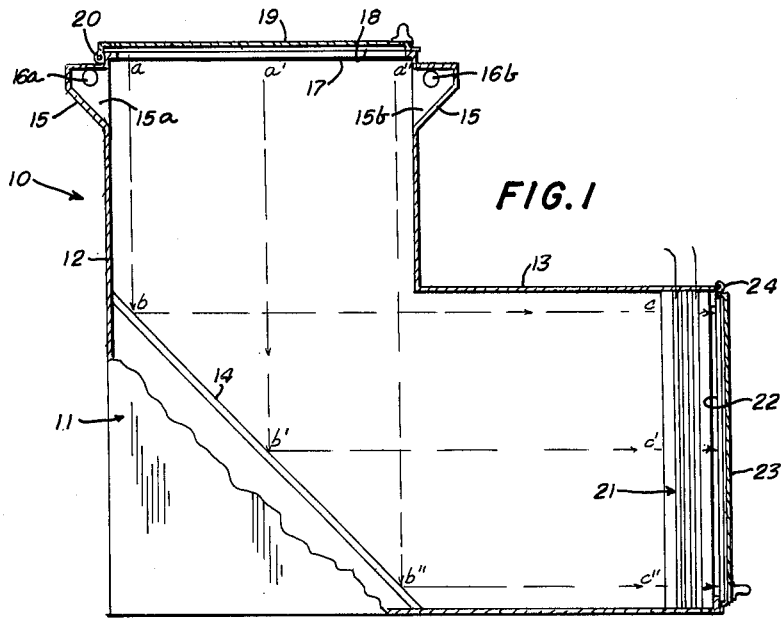
FIG. 1 is a diagrammatic side elevation partially in section of a device for exposure of sensitized paper according to this invention.

Referring first to FIG. 1 there is shown in diagrammatic form an exposure device generally indicated at 10 for reproduction of prints. The device has a housing 11 having a vertical portion 12 and a horizontal portion 13 which projects at right angles from about the lower end of the vertical portion 12. The portions 12 and 13 are of suitable rectangular shape in cross section in the preferable form. A mirror 14 is mounted inside housing 10 at an angle of 45° with the wall of vertical portion 12 and having its upper end abutting thereto the lower end of mirror 14 is secured to the horizontal portion 13. Outwardly and upwardly extending flanges 15 oppositely disposed at the upper end of housing portion 12 and having suitable cap portions 15a' and 15b' form cavities 15a and 15b and each contains a light source 16a, 16b respectively. A glass plate 17 which is transparent to light is mounted across the top of the vertical portion 12 and the original print 18 is placed face down on the glass plate 17. An opaque cover 19 is positioned on top of the print to hold the print in position and preclude outside light from entering the housing 11. Cover 19 has a hinge 20 to allow removal and replacement of the original print 18. At the remote end of horizontal portion 13 is secured a radiation modifier 21. Diazo-sensitized paper 22 is placed in parallel relationship with the radiation modifier 21 and a cover 23 having a hinge 24 maintains sensitized paper 22 in position.

In operation visible light from light sources 16a, 16b, is reflected off original print 18 and on to mirror 14. The mirror directs this light to the radiation modifier 21 which changes the visible light to an ultra-violet radiation which exposes the adjacent diazo-sensitized paper 22. The operation of the radiation modifier will be explained more fully hereinafter.

By following light paths a, b, c, a', b', c', and a", b", c", indicated in FIG. 1, it is apparent that mirror 14 reflects an image of the print onto the radiation modifier exposing those portions of the sensitized paper corresponding to the reflective portion of the original, while the outline of the original print which does not reflect visible light will leave corresponding portions on the sensitized paper unexposed. Thus a positive copy of the print is produced on the diazo-sensitized paper 22 which can then be developed by any of the standard developing processes mentioned above. It will be appreciated, of course, that a lens or collimating means may be included within the housing 10 in order to provide a sharper image at the light modifier 21. Alternatively, the reflecting mirror 14, which has been shown for convenience as being flat, could be made concave to provide a focused image at the modifier 21.

Figure 2:
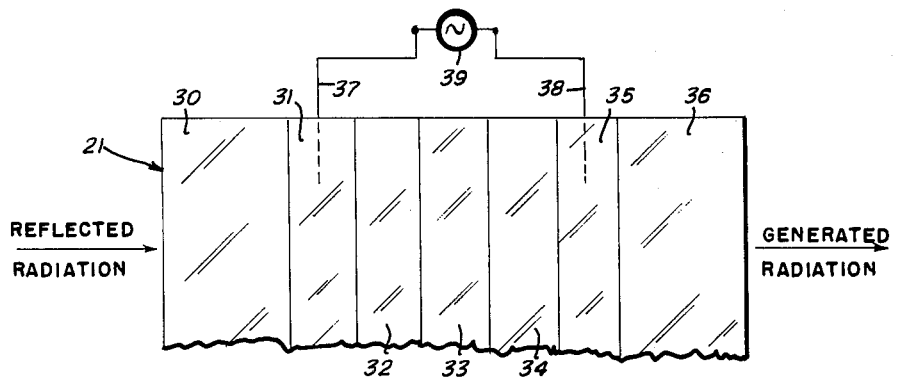
FIG. 2 is a diagrammatic side elevation on an enlarged scale of the radiation modifier of FIG. 1 with its bottom portion broken off.

The radiation modifier 21 is more clearly illustrated in FIG. 2 where it is shown as consisting of several layers of different materials. The layers are arranged proceeding from left to right as follows: glass layer 30, electrical layer 31, photoconductive layer 32, feedback-barrier layer 33, electroluminescent layer 34, electrical layer 35, quartz layer 36.

Glass layer 30 is transparent to visible light and serves as a mounting for subsequent layers. Electrically conductive layer 31 is vapor deposited on glass layer 30. Layer 31 is transparent to visible light as well as being electrically conductive. Layer 32 is made of selenium or an equivalent the electrical resistance of which decreases when exposed to visible light. Feedback barrier layer 33 is of a material which prevents feedback of radiation from the adjoining layer 34. Electroluminescent layer 34 is made of boron nitride or an equivalent material which emits ultra-violet radiation when the proper voltage and frequency is applied. Electroluminescent properties are discussed in U.S. Patent 2,921,218. Electrical layer 35 is similarly active with electrical layer 31. Quartz layer 36 is transparent to ultra-violet radiation and thus passes the radiation emitted from layer 34.

Electrical lead 37 is connected to electrically conductive layer 31 and electrical lead 38 is connected to electrically conductive layer 35. An A.-C. power supply 39 is connected to electrical leads 37 and 38 to energize electrically conductive layers 31 and 35.

The operation of the radiation modifier 21 is as follows: Visible light reflected from mirror 14 passes through glass layer 30 and electrical layer 31 and strikes photoconductive layer 32. At every point on photoconductive layer 32 where the visible light strikes the electrical resistance lowers, allowing most of the voltage produced across electrical layers 31 and 37 to be applied directly across electroluminescent layer 34. This increased voltage results in radiation from the electroluminescent layer of ultra-violet energy at all points on the opposite side from which the visible light strikes. This emitted ultra-violet radiation then passes through quartz layer 35 and exposes diazo-sensitized paper 22. It is apparent that layer 32 acts as a gate in that it is of high resistance when not illuminated and low resistance when illuminated by visible light.

Figure 3:
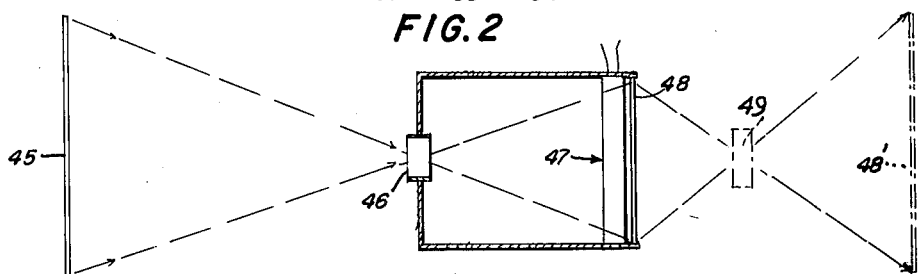
FIG. 3 is a side elevation of a modification of the device which allows reduction in size from the original print or changing the size of the controlled ultra-violet radiation pattern by a lens after it passes from the modifier.

Referring to FIG. 3 there is shown an original print 45, a lens 46, a radiation modifier 47 and sensitized paper 48 arranged to reduce the size of the original print. The original print is placed at a required distance from a suitable lens system 46 so that the reflected image of the original print is focused on the photoconductive layer of radiation modifier 47. When a diazo-sensitized sheet is in place at the output of radiation modifier the diazo-paper will be desensitized as explained above. This arrangement could also be used to enlarge the original print by rearranging the distances of the original print 45 and lens 46.

Another modification is illustrated in FIG. 3 wherein a lens system 49 can be placed between the controlled ultra-violet pattern at the output of the radiation modifier 47 and the sensitized paper 48' which replaces sensitized paper 48. This modification allows the use of a modifier which is smaller in height than the original print 45.

Although various exemplary embodiments of the invention are shown it will be understood that other embodiments and ranges of radiation with corresponding suitable deflectors, modifiers, and sensitized paper are possible without departing from the spirit thereof.

I claim as my invention:

1. The method of exposing a diazo-sensitized sheet to produce a positive copy from an original print on the sensitized sheet comprising the steps of reflecting visible light from the original print, directing the visible light to an electroluminescent radiation frequency converter, converting the visible light to ultra-violet radiation as it passes through the radiation converter and directing the ultra-violet radiation onto said diazo-sensitized sheet to reproduce the original print on the diazo-sensitized sheet.

2. The method of producing a copy of an original comprising the steps of producing a pattern of visible light corresponding to said original; passing said visible light pattern through an electroluminescent radiation converter to produce a pattern of ultra-violet light corresponding to said original; and exposing a diazo-sensitive sheet to said ultra-violet pattern whereby an image of said original is produced.

3. The method of claim 2, wherein said image is a positive copy of said original.

4. The method of claim 2, wherein said pattern of visible light is produced by reflecting visible light from the surface of said original.

5. The method of producing a copy of a positive original comprising the steps of reflecting visible light from the surface of said original to produce a pattern corresponding to said original, passing said visible light pattern through an electroluminescent radiation converter to produce a corresponding pattern of ultra-violet light, and exposing a diazo-sensitive sheet to said ultra-violet light pattern to produce a positive copy of said original.

6. The method of exposing a diazo-sensitized sheet to reproduce an original illuminated only by visible light comprising the steps of producing a visible light pattern corresponding to said original, directing said visible light pattern onto an electroluminescent panel, converting said visible pattern to a corresponding ultra-violet light pattern, and directing said ultra-violet pattern onto said sheet.

7. The method of claim 6, wherein the reproduction obtained by exposing said diazo sheet is a positive copy of said original.

8. The method of producing a copy of an original comprising the steps of producing a pattern of visible light corresponding to said original, passing said pattern of visible light through electroluminescent radiation converter means to produce a pattern of ultra-violet light corresponding to said original, and exposing a sheet sensitive only to ultra-violet radiation to said pattern of ultra-violet light, whereby an image of said original is produced.

9. The method of claim 8, wherein said original is carried on an opaque surface, and said pattern of visible light is formed by reflecting visible light from said surface.

10. The method of claim 8, wherein said original is carried on a surface transparent to visible light, and said pattern of visible light is formed by passing visible light through said surface.

11. The method of claim 8, wherein said sheet is a diazo-sensitized material.

References Cited by the Examiner

UNITED STATES PATENTS

| | | | |
|---|---|---|---|
| 2,163,776 | 6/1939 | Current et al. | 88—24 |
| 2,319,882 | 5/1943 | Reager et al. | 88—24 |
| 2,758,939 | 8/1956 | Sugarman | 96—91 |
| 2,789,904 | 4/1957 | Benbrook et al. | 96—91 |
| 2,882,419 | 4/1959 | Diemer et al. | 313—108.1 |
| 2,896,087 | 7/1959 | Kazan | 313—108.1 |
| 2,921,218 | 1/1960 | Larach et al. | 313—108.1 |
| 2,996,381 | 10/1961 | Oster et al. | 96—91 |

NORMAN G. TORCHIN, *Primary Examiner.*